Aug. 18, 1931.   G. GRINDROD   1,819,023
PROCESS FOR TREATING FOODS
Filed Aug. 6, 1927
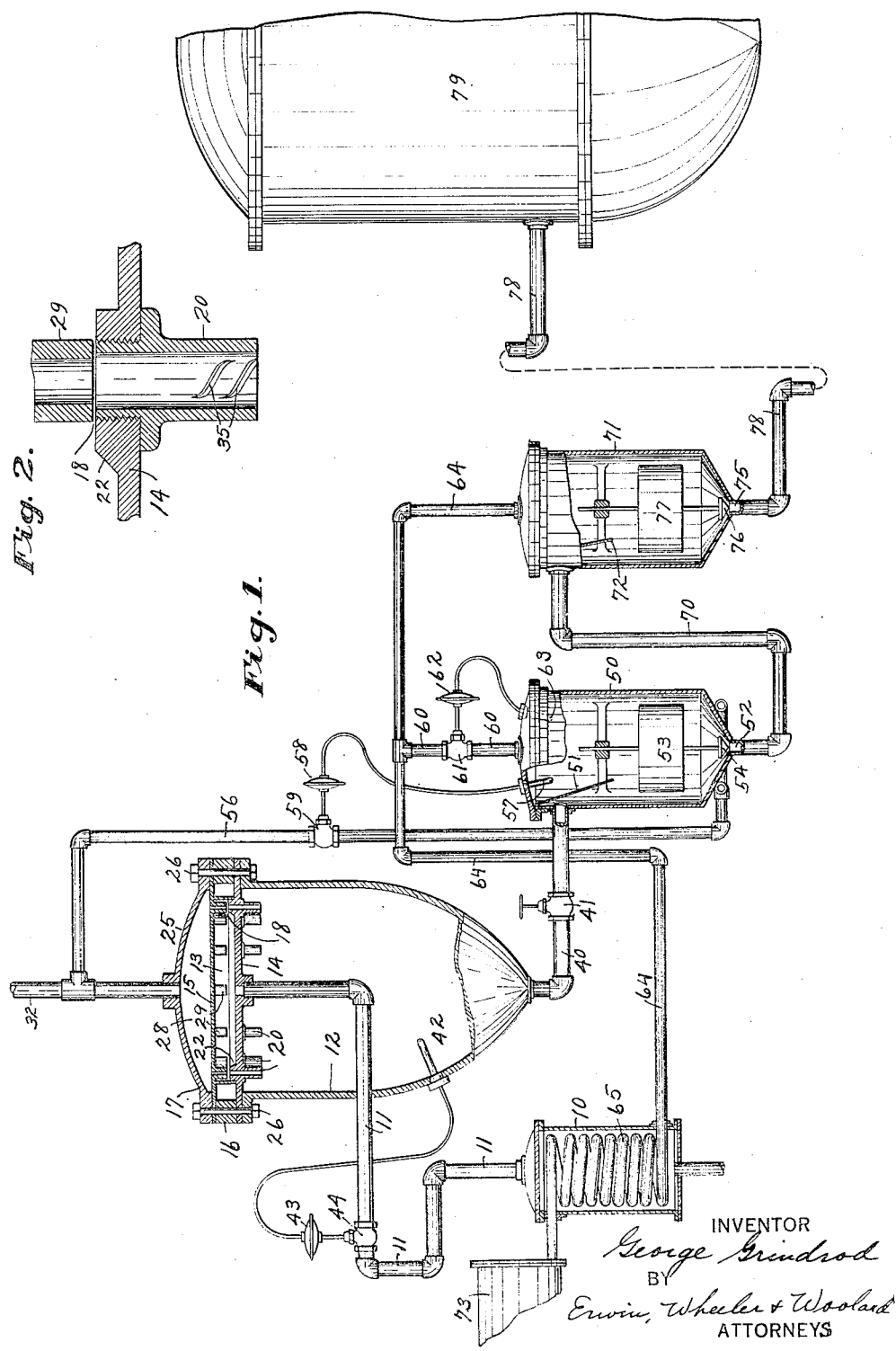
INVENTOR
George Grindrod
BY
Erwin, Wheeler & Woolard
ATTORNEYS Patented Aug. 18, 1931

1,819,023

UNITED STATES PATENT OFFICE

GEORGE GRINDROD, OF OCONOMOWOC, WISCONSIN, ASSIGNOR TO GRINDROD PROCESS CORPORATION, OF WAUKESHA, WISCONSIN, A CORPORATION OF WISCONSIN

PROCESS FOR TREATING FOODS

Application filed August 6, 1927. Serial No. 211,022.

My invention relates to improvements in processes for treating foods such as milk, cream, fruit juices and other liquid and semi-liquid foods or food products to preserve the same by sterilization. A divisional application Serial No. 324,768, filed December 8, 1928, describes and claims apparatus suitable for carrying out the processes herein disclosed.

Sterilization is destruction of living organisms, including spores. It necessarily involves the destruction of all living cells capable of performing life functions, particularly reproduction.

Heretofore, the principal agencies relied upon to effect sterilization were heat, life destroying chemicals and oxygen extracting and excluding agencies, the latter being, however, impractical for various reasons, as a commercial method where complete sterilization is required. The use of chemicals for the sterilization of food products is also not generally available in the treatment of foods and therefore the prevailing method of sterilizing foods is the thermal method, i. e.—that of subjecting the material to a temperature sufficient to destroy all life within a given period of time.

The thermal method has well recognized disadvantages due principally to the fact that the character, flavor and composition of the food is usually altered. In the sterilization of milk by the thermal method, the fat globules tend to break down and the albumen tends to coagulate. The customary practice is to raise the temperature of the food to a sterilizing temperature and maintain it at that temperature for about thirty minutes without materially increasing it beyond the degree necessary to complete the process within that period, although it has long been known that the process can be accelerated by increasing the temperature in cases where the nature of the food is such that higher temperatures may be employed without destroying or impairing the value of the product. But in the treatment of milk and allied food products, the time required to heat the food to the higher temperature, plus the time required to again cool it to a point where deterioration in quality and flavor will be arrested, has been found to be of such duration as to preclude the use of the higher temperatures for such purposes. Therefore the moderate temperatures, requiring an interval of about thirty minutes to complete the process, are usually employed.

The problems indicated in the foregoing statement of prior art practice have caused me to seek another method of sterilization in the practice of which, the quality, characteristics and flavor of the food will be less subject to change or impairment. I found that by injecting steam directly into milk, or products of milk, the liquid content of the food in proportion to the solids could be increased, the resistance of the albuminous material to heat increased so that there would be less co-agulation, and the time of exposure to a given temperature could be reduced, thereby enabling me to produce a sterilized product of substantially natural quality and flavor closely similar to that of the unsterilized fresh milk or milk product. This method forms the subject of my co-pending application Serial Number 734,566, filed August 28th, 1924, pursuant to which Letters Patent No. 1,714,597, dated May 28, 1929, have been granted. In the practice of that process the thermal method of sterilization is principally relied upon although the violent agitation of the material due to collapse of steam bubbles and the ebullition caused by their rapid rise through the liquid suggested the possibility that sterilization by heat was being accelerated by the rupturing effect of impacts of the particles of milk in such a state of violent agitation incidental to the method employed for rapidly heating and cooling the milk, and that this enabled me to work at given temperatures for shorter periods of time.

Biologists have pointed out that while all forms of life have certain degrees of adaptability to changes in environment, the power of adaptation is subject to limitations both as to time allowed for such adaptation and the degree of change required to meet the new environment. For example, a human being can survive changes in atmospheric pressure to only a very limited degree, if the changes are rapid, but to a much greater degree if the rate of change is slow enough to permit the human organism to adapt itself to such changes as they progress. I have found by experiment that bacterial life may readily become enured, (adapted), to high temperatures, which, if applied suddenly in a first instance, would destroy such life.

I have therefore been led to experiment with changes other than heat in the environment of bacterial life, and my experience in the practice of the process described in said co-pending application has led me to the discovery that it is possible to subject living cells and bacterial organisms to pressure changes, both external and internal, of such a character as to require greater tenacity and resiliency, or power of resistance, than that possessed by the walls of any existing living cell or cellular tissue. I have also discovered that while living tissue responds readily by expansion and contraction to gradual pressure changes, it readily ruptures if subjected to pressure changes calling for a more rapid expansion or contraction than is required under the ordinary conditions to which such organisms are accustomed. Further, I have discovered that impactive pressures may be applied to small particles of material in such a manner that a single instantaneous application of such pressure, either internally or externally applied, or applied externally by compression, followed by a violent internal expansive reaction, may be relied upon to completely exterminate all life in such particle.

It is therefore the object of this invention to devise a method of subjecting foods such as milk and other materials capable of minute subdivision, to violent pressure changes and reactions so abruptly applied and of such a character as to disrupt and destroy all bacterial life therein without materially affecting the food value, flavor and other characteristics of the food. Incidentally, I may use heat to produce the desired internal pressures and I also propose to utilize the internal heat mechanically generated by the application of external pressure, it being my purpose to apply such pressure with a suddenness and violence capable of causing a rapid rise of internal temperature, with a consequent violent expansive reaction, the heat rise within the living cell being greater, and a high temperature more instantly developed than in the surrounding media, and greater than it is possible to attain by the heating agency externally applied during the same instant of time, for the reason that the heat of compression is added to the heat absorbed from the surrounding media.

Conceivably, it is possible to completely destroy all living cells within a body of material such as milk by violent variations in pressure, or by violent impacts delivered directly upon or against the living cells or cellular tissue, without any material rise in the temperature of the milk or other surrounding media. But I find it convenient and desirable from the standpoint of effectiveness to employ steam at a high pressure, or at a high velocity, as the impacting agent, and in the practice of my process according to the preferred method herein disclosed, the material may be, and ordinarily will be, heated for a brief interval to a sterilizing temperature. This is incidental to the method employed for applying the pressure and it is also desirable in that it ensures destruction of any possible residual life and also prevents re-infection.

But the degree of temperature to which the material is raised during the treatment of the food by the method herein disclosed may be considerably less than that required for ordinary thermal sterilization during the same time interval, and it may be safely reduced in proportion to the perfection of the apparatus with reference to the certainty of a direct impact of a particle of steam or other elastic fluid having the required velocity and inertia, upon each living cell in the liquid treated, and the immunity from reinfection from the surrounding atmosphere. This is true for the reason that my improved process is dependent primarily upon the application of disrupting pressures to the cellular tissue regardless of temperature changes other than those incidental to the application of the desired pressure with the necessary violence.

I am aware of the fact that in all sterilizing processes dependent upon the use of heat, the living cellular tissue is subjected to pressure changes, at least as to internal pressure, and that ruptures of the cell walls may occur in many individual instances, particularly after the cell wall has disintegrated in part in response to a cooking temperature. Also, in heating processes wherein violent ebullition of the material takes place, as in the case when steam is injected into the material below its surface, impacts necessarily result, in some instances, which may rupture the cell walls of the living tissue. But while such ruptures accidentally occur, and are incidental to certain processes of thermal sterilization, yet, so far as I am aware, the fact that rupture by pressure changes may be made the primary or principal agent of sterilization has never before been appreciated nor has conscious and directed effort to uniformly produce such rupture been attempted.

It is a further object of my invention to devise a method of and apparatus for, sterilization by pressure change, in which each particle of material and, as nearly as possible, each living cell therein, may be segregated and directly exposed to the cell destroying pressure and each living cell or organized group of cells destroyed in a single application of such pressure, or a single momentary exposure to such pressures.

Incidental to the accomplishment of the objects above stated, it is my further object to provide a continuous process for the treatment of liquids and one in which the destructive effect upon the bacteria and spores due to the impact of steam particles, the explosive or rupturing effects due to the sudden rise in the temperature of the fluids within the living cells, the inability of living organisms to adapt themselves to the violent pressure and temperature changes, and the further rupturing effects of sudden inertia changes, and the frictional contacts of the liquid particles upon each other may all be accentuated beyond anything heretofore accomplished in those particulars, whereby the degree of temperature, and also the time interval during which the material is exposed to destructive temperature conditions, may be greatly reduced and changes in chemical composition, flavor and other characteristics of the material may be more completely avoided.

With reference to the preferred form or embodiment of my method, it may be stated that it is the object of this invention to deliver material in the form of a film or thin layer across the paths of a series of minute steam jets in such a manner that substantially all particles of the material in the path of each steam jet will be struck by the particles of steam and carried with the steam through a passage into a chamber from which the material may be continuously delivered; to provide means whereby each particle of the material to be treated will be subjected but once to the impact of the jet of steam; to provide for collecting and continuously delivering the material so impacted under conditions which permit a degree of thermal sterilization, when desired, without interruption in the continuity of the precess or in the continuous delivery of the sterilized material; to provide for an automatic regulation of such delivery for the purpose of temperature control; to provide for the utilization of a portion of the steam to prolong the maintenance of thermal sterilization in the material subsequent to its exposure to the impact of the previously mentioned particles of steam; to provide for a delivery of the sterilized or sterilizing material into a vacuum chamber in a stream which is substantially continuously moving but in which the movement may be regulated by brief interruption or otherwise in a manner to maintain substantial uniformity in the thermal treatment of all the particles of the material and to finally deliver the same into a reservoir in a thoroughly sterilized homogenous condition and substantially in its natural condition except for the absence of living organisms.

In the accompanying drawings:

Figure 1 illustrates a preferred form of apparatus for carrying out my improved process, the milk containers or chambers other than the final reservoir being illustrated in vertical section and the piping and controlling valves being illustrated conventionally.

Figure 2 is an enlarged fragmentary sectional view of one of the nozzles showing the means for twisting the jet.

Like parts are identified by the same reference characters in both views.

In further describing my improved process it will be assumed that the material to be treated comprises fresh milk. This milk is caused to flow in the form of a film or thin layer transversely across small jets of steam, which may be about five hundredths of an inch in diameter. The steam is delivered at the jets with a pressure of about 100 lbs. to the square inch and corresponding temperature. A high velocity will be developed at the point of delivery and the milk is caused to enter this jet, preferably from all sides and in close proximity to the steam delivery point whereby each particle of the milk will be subjected to the impact of particles of steam and its temperature instantly raised to nearly that of the steam, beyond the point of intermingling. Each steam jet should be of minimum practical size in order to ensure that each particle of milk will come into contact with the surface of the steam jet for much experimental evidence indicates that destruction of bacteria by impact is a result of surface action only. It is obvious that the steam particles are the bodies in motion, whereas the particles of milk are virtually at rest until the instant of contact, and therefore receive the full force of the blow. After they are entrained and carried along with the steam jet, this disrupting factor is no longer effective. But, it is also true that violent impacts generate heat and therefore if a bacterium spore, cell or group of cells substantially at rest receives the direct impact of a particle of steam which has developed kinetic energy in an escaping jet, it is obvious that no living cell or small group of cells could withstand the force of such a blow coupled with an instant or substantially simultaneous internal temperature rise having a range of violent change far beyond those to which living organisms are adapted, and probably reaching a degree at which no life could withstand even a briefly prolonger exposure. To these factors is added a third, viz:—the violent expansion incident to the rapid temperature rise due to the heat of the steam and that generated by impact. The internal expansion of the cells is not resisted to any adequate extent by the surrounding medium and the expansion is too rapid to allow a relief of internal pressure without extensive and destructive rupture. Under such conditions the cells are necessarily ruptured or exploded by the forces of impact coupled with sudden violent internal expansion due to heat.

From the foregoing it will be obvious that it is important to the full attainment of the result sought, viz:—the complete sterilization of the liquid,—that direct impact contacts of the steam with every living bacterium or spore, be obtained. With a steam jet 0.05 of an inch in diameter the ratio of cross sectional area to circumference is 1:80. The effective part of the jet is represented by the circumference or contact surface. Therefore, it is obvious that such a jet will be much more effective in the disruption of living cells than a larger jet, such for example, as a jet 0.375 of an inch in diameter in which the ratio of cross sectional area to circumference is only 1:10.56. The ideal condition would be realized if it were practical to subject the milk to the action of a steam jet of not exceeding twice the diameter of a bacterial spore or about four microns, upon a milk film of substantially the same thickness. If such jets could be produced and utilized in the described manner, complete sterilization could doubtless be attained by one impacting operation.

But from a practical stand-point, it appears necessary to employ steam jets approximating a diameter of 0.05 and to deliver milk thereto in films of a flowing volume or depth and I, therefore, have found it possible and desirable to utilize the principle of thermal sterilization at high temperature for a short, but accurately controlled period of time, at least for the purpose of preventing re-infection. The use of small steam jets of practical size as above described facilitates this supplemental sterilization in that I am able to use the residual heat of the steam to prevent a too rapid reduction in the temperature of the milk until the desired period of thermal sterilization has elapsed and then instantly chill the milk to a degree where neither its composition nor quality will be altered, by allowing the steam to escape into a condenser and vaporizing the water of condensation or surplus water content of the milk to be also withdrawn into the condenser.

If the milk is cold when impacted by the steam as above described, water of condensation will be introduced in quantity equal to substantially six per cent of the volume of the milk, but if the milk is preheated, the condensation can be considerably reduced. If the milk is preheated, the residual steam may be utilized, but in order to preserve the flavor of the material treated and prevent disintegration, only a moderate degree of preheating is possible. In the treatment of milk, I find that it is not desirable to preheat the milk beyond a temperature of 160° F. While it is true that all preheating tends to reduce the extent of the expansion of living cells during the disrupting stage of my process, to the extent of the preliminary expansion, yet the extent of the expansion at the high internal temperatures developed at the steam jets is far beyond anything to which living cells are adapted, so that it constitutes a substantially irresistible disruptive force under the described conditions of impact and friction, irrespective of any thermo sterilizing effects.

I will now describe the apparatus shown in the drawings and which I prefer to use in carrying out the process above described.

In the particular apparatus shown in the drawings, the material may be fed through a preheating or warming chamber 10, although this is not essential. From the warming chamber, the material passes through a conduit which, in the drawings, is represented by the pipe 11. It conveys the material into a chamber 12 which has the general form of an inverted bell and delivers it into a cavity 13 formed by the horizontal walls 14 and 15, spaced by a peripheral wall or ring 16 and preferably by an annular fluid tight wall 17 forming the outer or side wall of the cavity 13. Assuming the material to be a liquid such as milk, it will flow outwardly across the wall or floor 14 of the cavity 13 and this floor has an annular row of apertures leading into the bell shaped space or cavity 18. Tubular nozzles 20 extend through the apertures and downwardly in the cavity 18. At their inlet ends they preferably extend upwardly to a short distance above the level of the wall 14 and if the nozzles are formed separately, the wall 14 may be provided with tubular bosses 22 to receive them, although, if desired, the nozzles may be formed integrally with the bosses and with the wall 14.

The upper wall 15 of the cavity 13 is covered by a head piece or cap 25 which may be clamped in position by bolts 26, the margins of the wall or partition 15 being clamped between the head piece 25 and the ring 16 as shown. The head piece is formed to provide a steam cavity 28 above the partition 15 and the partition 15 is provided with an annular row of steam nozzles 29, the exterior diameters of which may correspond with the nozzles 20, although the passages through the nozzles 29 are much smaller than those through the nozzles 20 and are preferably made as small as is reasonably practical, consistent with the purpose of delivering sterilizing steam jets to the fluid contained in the cavity 13 in accordance with the process above described.

The gap between the lower ends of the nozzles 29 and the upper ends of the nozzles 20 determines the thickness of the film of milk or other material to be fed into the path of the steam jets. In the construction shown, it may be assumed that the apertures through the steam jet nozzles 29 are approximately 0.05 of an inch in diameter. The passages through the nozzles 20 are considerably larger in diameter or capacity, but the dimensions are not mentioned for the reason that exactness in the diameter of these passages is not required. They are merely made large enough to reasonably allow the passage of the steam and to allow particles of milk or other material to pass freely through them, these passages being aligned with those of the steam jet nozzles. Any desired number of registering nozzles may be provided within the capacity of the cavity of the chamber 18 and its outlet to handle the delivered material.

Steam is delivered into the cavity 28 from any suitable source of supply through a pipe 32 and is preferably delivered at a pressure of approximately 100 lbs. to the inch and at a temperature in excess of 300° F. The liquid or material delivered into the cavity 13 passes between the adjacent ends of the nozzles 29 and 20 and the particles are continuously struck by steam escaping from the nozzles 20 and driven into the cavity 18. The lower end of each nozzle 20 is preferably formed interiorly with a short segment of a helix whereby the material is delivered into the cavity 18 in the form of a whirling spray. One of the nozzles 20 is illustrated in the enlarged sectional view, Fig. 2, and shows a short length of helical blade 35 at the mouth of the nozzle for the purpose of producing a whirling spray or imparting to the jet a helical twist as it enters the cavity 18. An outlet duct 40 leads from the bottom of the chamber 12 and has a cavity which is preferably insufficient to carry off the liquid as rapidly as it is delivered through the nozzles 20. The capacity of the duct 40 may be regulated by a gate valve 41. As the liquid accumulates in the cavity 18 some pressure develops in this cavity, but in order to prevent the development of excess pressure and temperature in the cavity 18, I preferably employ an automatic temperature controller 42 which has its bulb connected with a diaphragm chamber 43, the diaphragm of which controls a valve indicated at 44 in the supply pipe 11. By thus controlling the quantity of milk or other material to be delivered to the apparatus, it is possible to control both temperature and pressure within the cavity 18, for by reducing the quantity of milk delivered, accumulation beyond a desired level in the cavity 18 may be prevented and the more nearly empty this cavity becomes, the greater will be the expansion of the steam and the consequent reduction of temperature and pressure.

The object of allowing an accumulation of milk or other material in the cavity 18 is partially to prevent the escape of steam through the outlet 40 but also to allow sterilizing temperature to be maintained in the cavity 18 so that the material may be subjected to a degree of thermo-sterilization for a short period following the initial steam treatment when delivered to the nozzles 20. This may not be essential, but I preferably employ this means for a supplemental thermo-sterilization because of the fact that fragments of small organisms may survive when apparently completely disrupted. While such a condition is theoretically impossible after the organisms have been impacted and their temperature violently changed by the direct steam treatment, yet the difficulty of making nozzles small enough to ensure direct contact of particles of steam with all of the living cells renders it desirable to add a supplemental sterilization, inasmuch as provision can be made for it within a period so brief as to avoid changes in the chemical composition, characteristics or flavor of the material treatment.

If desired, additional supplemental provision may be made for further thermo-sterilization. In the drawings, I have illustrated a secondary chamber 50 which receives the material from the pipe 40, the baffle 51 being employed to throw the material downwardly within this chamber toward the outlet 52 at the bottom thereof. I have provided a float 53 in this chamber which controls an outlet valve 54 whereby the material in the chamber may be discharged whenever it accumulates to such an extent as to lift the float and whereby such discharge will be checked whenever the level of the material falls to such an extent that the float allows the valve to close.

Steam may be admitted to the chamber 50 directly from the pipe 32 through the branch pipe 56, the flow of steam being regulated by the temperature controller 57 with its associated diaphragm chamber 58 in control of the steam pipe valve 59.

The escape of steam from the chamber 50 may also be permitted through a pipe 60 having a valve at 61 controlled by a diaphragm at 62 operated by the temperature controller bulb 63.

The steam delivered through the pipe 60 may be conveyed by a pipe 64 to a coil 65 in the prewarming chamber 10, thereby supplying the heat for prewarming purposes.

In the construction shown, the chamber 50 discharges its liquid or other material through a pipe or duct 70 into an expansion chamber 71 where a baffle 72 again directs it toward the bottom of this chamber. The pipe 64 leads from the top of this chamber and allows a free and unobstructed escape of the steam to a condenser indicated at 73. Therefore, the interior of the chamber 71 may be without pressure the degree of vacuum in the condenser extending thereto. The outlet 75 of the chamber 71 is provided with a valve 76 controlled by a float 77 whereby the contents of this chamber will be intermittently discharged through a pipe or duct 78 into a reservoir or receiver 79 which may also be assumed to be under vacuum. The reservoir 79 may also be assumed to be located below the level of the chamber 71 whereby the liquid will flow into the reservoir 79 by gravity.

The operation of the apparatus will be understood from the foregoing description but it will be obvious that the structure may be modified almost indefinitely without departing from the scope of the invention as set forth in the appended claims. The terms and expressions contained in this specification and in the appended claims are used for the purposes of description and not of limitation and while I have shown a structure in which the material is delivered through a series of chambers, I do not intend to indicate that a series of chambers is essential. In fact, I contemplate the possibility of complete sterilization by impact in a continuous operation during which every living organism will be exposed to the direct action of particles of steam moving at high velocity at the surface of the jet and acting upon the living cells with crushing impact followed instantly by a rise in internal pressure temperatures and disrupting expansion to which it is beyond the power of any living organism to adapt itself and maintain life.

I am aware of the fact that materials have been subjected to the direct action of steam in an effort to sterilize such materials and that pasteurization and partial sterilization has at times been accomplished, but for the purposes herein set forth, complete sterilization is essential and in order to accomplish complete sterilization, it is necessary to do something more than to merely inject steam in a haphazard fashion into the body of the liquid to be treated. I believe I am first to provide for the presentation to steam jets of the liquid to be treated in a manner to subject to direct impact all of the particles of liquid, and as nearly as may be possible, all the living organisms contained therein. I also believe that I am the first to provide for such direct contact of the steam with successive small particles of material at a velocity capable of imparting destructive impacts to the organisms, contained in such particles irrespective of actual contact of the steam with each cell and coupled with such a rapid change in temperature and internal temperature and expansion as to make adaptation impossible and ensure destruction of life within the liquid so treated.

I claim:

1. The process of sterilizing milk and other materials, capable of minute subdivision, which consists in minutely subdividing such material and subjecting each minute particle thereof to contact with steam having sufficient temperature and pressure to effect, in the individual particles, a violent change in temperature and pressure, the degree and abruptness of such change being in excess of that which can be withstood by living cells.

2. The process of sterilizing milk and other materials, consisting in causing a film of the material to intersect the path of a jet of flowing steam capable of subjecting each particle thereof to abrupt violent change in pressure and internal temperature beyond the power of adaptation of living organisms therein, and then subjecting the material momentarily to a sterilizing temperature.

3. The process of sterilizing material which consists in subjecting the particles of material successively to contact with a high velocity steam jet while allowing such particles to compress and reactively expand without material support from surrounding media.

4. The process of sterilizing material, consisting in delivering such material in a thin stream into the path of a high velocity steam jet in a manner to subject living organisms in the material successively to the impact of particles of steam under conditions which allow for compression, rapid heat absorption, and reactive expansion without sufficent support from surrounding media to prevent substantially free cell rupturing compression, distortion, and reactive expansion.

5. The process of sterilizing material capable of minute subdivision, which consists in passing a film of such material across the paths of minute jets of steam moving at high velocity, whereby to subject each particle of the material to the impact of a particle of steam at the surface of one or another of the jets.

GEORGE GRINDROD.